United States Patent [19]

Archer

[11] Patent Number: 4,520,621

[45] Date of Patent: * Jun. 4, 1985

[54] GARDENING TOOL

[76] Inventor: Gene R. Archer, 8225 Gale Rd., Rte. 1, Hebron, Ohio 43025

[*] Notice: The portion of the term of this patent subsequent to Nov. 15, 2000 has been disclaimed.

[21] Appl. No.: 526,271

[22] Filed: Aug. 25, 1983

[51] Int. Cl.³ .............................................. A01D 7/00
[52] U.S. Cl. ............... 56/400.11; 56/400.04; 56/400.01
[58] Field of Search ........... 56/400.01, 400.04, 400.02, 56/400.03, 400.11

[56] References Cited

U.S. PATENT DOCUMENTS

| | | | |
|---|---|---|---|
| 31,152 | 7/1899 | Rock | 56/339 |
| 245,279 | 8/1881 | Collins | 56/400.4 |
| 1,158,649 | 11/1915 | Doust | 56/400.11 |
| 1,225,097 | 5/1917 | Young | 56/339 |
| 1,227,478 | 5/1917 | Meulier | 56/400.04 |
| 1,439,964 | 12/1922 | Key | 56/400.04 |
| 2,162,648 | 6/1939 | Slusher | 56/400.2 |
| 3,688,483 | 9/1972 | Hamilton | 56/400.11 |
| 4,224,786 | 9/1980 | Lanolie et al. | 56/400.03 |
| 4,414,297 | 11/1983 | Archer | 56/400.01 |

FOREIGN PATENT DOCUMENTS

| | | | |
|---|---|---|---|
| 3031319 | 3/1982 | Fed. Rep. of Germany | 56/400.01 |
| 884081 | 12/1961 | United Kingdom | 56/400.01 |

Primary Examiner—Paul J. Hirsch
Attorney, Agent, or Firm—Robert B. Watkins

[57] ABSTRACT

A gardening tool similar to a rake and having a handle portion, a bridge supporting means and a flexible comb element with a cover. The tool provides a flexible response to uneven terrain and offers an increased ability to gather and remove earthen debris. The tool may be used as a scooping means as well as a gathering tool.

12 Claims, 4 Drawing Figures

GARDENING TOOL

FIELD OF THE INVENTION

This invention relates to a gardening tool and more particularly to a type of gardening tool that is similar to a rake in combination with an open mesh scoop.

BACKGROUND OF THE INVENTION

Gardening tools have been designed in a great variety of ways in the past but these designs have usually been constructed of rigid materials. Various mechanical contrivances have been included which were intended to facilitate the collection of the gathered matter. A recent example of a proposed solution to the problem of removal of material is found in U.S. Pat. No. 2,652,680—Adams. Other typical examples of prior art include U.S. Pat. Nos. 827,542—Lawson, 1,439,964—Key, and 882,467—Hubbell. Such examples have either been difficult to operate efficiently or ineffective in containing the earthen debris. Previous attempts, as in the Adams patent, of accomplishing this same collective action have involved large and heavy trapping boxes.

SUMMARY OF THE INVENTION

Briefly and in summary, this invention is a gardening tool having a handle and a rake element. The rake element of the invention is comprised of a bridge portion centrally connected to the end of the handle and having a plurality of laterally extending flex portions on opposite sides of the handle connection and depending or extending downward where they join with a comb element which has downward projecting sinuous lobes or tines. The comb element is of a flexible non-metallic polyethylene or polystyrene type material with an open top. The bridge portion to which the comb element is connected has an open front. A cover/scoop, which can be inserted and fixedly connected to the open top and open front is provided. The cover is preferrably constructed of open basket-like mesh material which makes it lighter than solid material and makes it possible to view the progress of filling action.

My previous invention disclosed in U.S. patent application, Ser. No. 327,556, now U.S. Pat. No. 4,414,797, is addressed to the advantages having a flexible comb element which, when it is drawn over the earth, conforms to that irregular surface and increases gathering proficiency. This present invention further expands upon these concepts to include a means for securing and disposing of the gathered material as well. When the detachable cover is attached it prevents the leaves, sticks and other rubble from escaping over the top of the comb element.

Used in conjunction with the semi-circular flexible comb, the open basket-like cover of this invention creates an effective collection receptacle. And as disposable matter is accumulated, the cover can be used as a scooping means to lift and remove it, either separately or installed on the rake element.

It is an object of this invention to provide a means whereby earthen debris may be efficiently collected in a simple and easy manner. This will be accomplished at a minimum cost through the use of new materials and production methods. It is a further object to exploit the innovative concept of the flexible comb element by combining it with a collection means. The twist/flex action (torque) of the bridge maintains ground contact under pressure permitting the rise and fall of the comb element over terrain without affecting the elevation or position of handle (knee action).

The foregoing and other advantages of the invention will become apparent from the following disclosure in which a preferred embodiment of the invention is described in detail and illustrated in the accompanying drawings. It is contemplated that variations in procedures, structural features and arrangement of parts will appear to the person skilled in the art, without departing from the scope or sacrificing any of the advantages of the invention.

DETAILED DESCRIPTION OF THE INVENTION

Figure 1:
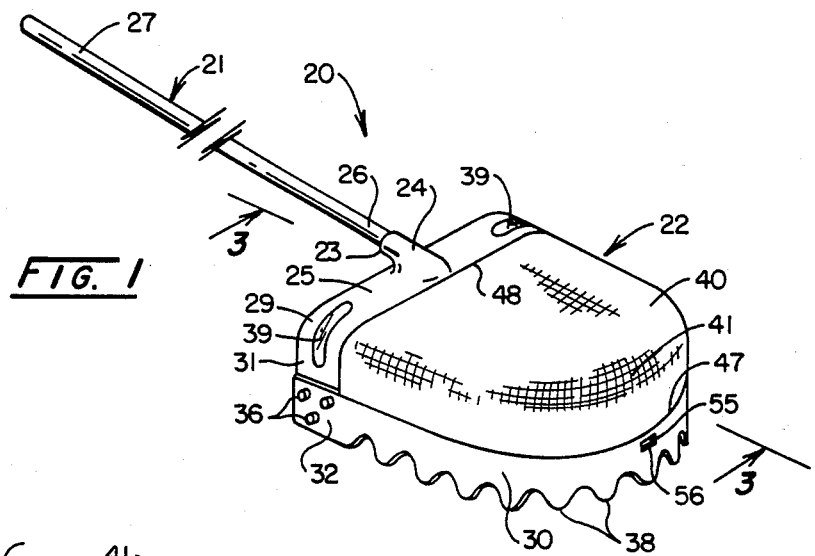
FIG. 1 is a perspective view of a preferred embodiment of this invention.
Figure 2:
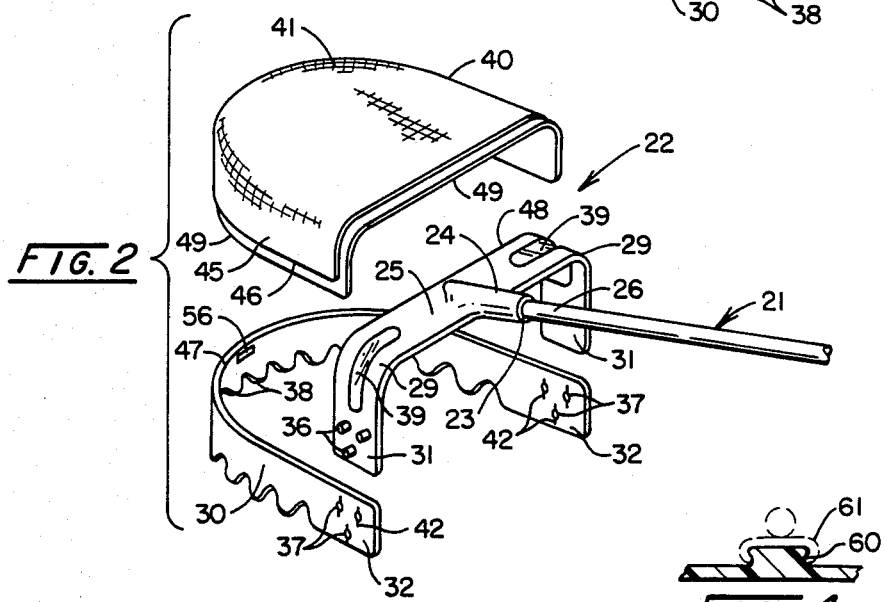
FIG. 2 is a perspective view from the opposite direction of the embodiment of FIG. 1 in a disassembled state.
Figure 3:
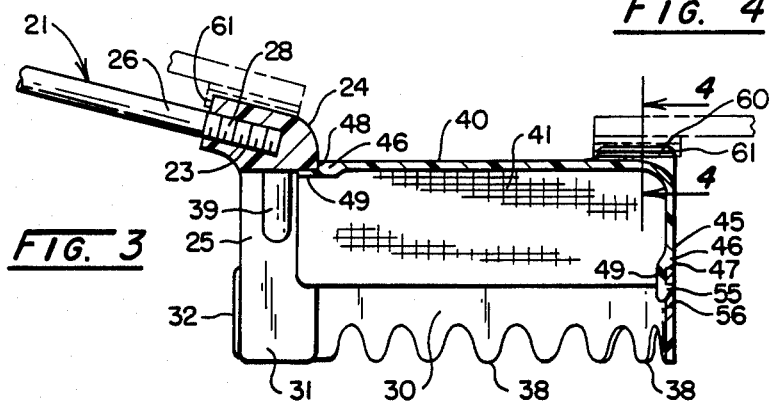
FIG. 3 is a cross-sectional view taken along line 3—3 of FIG. 1.

Referring to FIGS. 1, 2 and 3, a gardening tool 20 comprises a handle 21 and a rake element 22 including a bridge portion 25, a comb element 30 and a cover 40. In a preferred embodiment, the handle 21 may be threadly attached to the rake element 22 by a grooved receptacle 23 within a centrally positioned raised cylindrical extension means 24 on the top of the bridge portion 25.

The handle 21 is elongated and cylindrical or other convenient shape formed to fit the hands of a worker and having an attachment end 26 and a grasping end 27. The attachment end 26 is provided with threaded grooves 28, so that it can be fixedly attached by being threadly engaged within the grooved receptacle 24 of the bridge portion 25.

The bridge portion 25 extends transversely and laterally on both sides from the centrally located receptacle 24. Each side depends downward at an angle by means of a bend 29 to a lower section 31 where an attachment to an end portion 32 of the comb element 30 is accomplished. In the embodiment shown, a plurality of pins 36, projecting from the lower sections 31 of the bridge element 25 are provided for insertion within a plurality of circular holes 37 in the ends 32 of the comb element 30. The holes 37 are provided with slits or slots 42, allowing the holes to be elastically deformed over the pins 36, in the manner of a button and button hole.

The principles of securing the comb element 30 of the raking means by attachments at either end 32, which is a part of my previous invention, enables the elastic comb element 30 having downward projecting sinuous lobes or tines 38 to flexingly adapt to the contours of the earth for improved gathering efficiency. The comb element 30 will preferably be constructed of one piece of molded non-metallic polyethylene or polystyrene type plastic although it may also be an appropriate metal. Graduated downward pressure on the handle 21 causes the comb element 30 to be held firmly on the ground with an elastic response during use of this invention. Reinforcing ribs 39 strengthen the bridge portion to withstand this downward pressure as well as the inward pressure of the comb element when attached.

The cover 40 is shaped to fit securely within the corresponding opening formed by the open top of the comb element 30 and the open front of the bridge portion 25. Preferably it is comprised of a flexible mesh material 41 which will collect and hold debris while allowing the comb element 30 to adapt to the terrain.

As seen in FIG. 3, the perimeter edging 45 of the cover 40 is constructed of a semi-rigid molded material that has an outer section 46 which abuts a top edge 47 of the comb element 30 and a front edge 48 of the bridge portion 25 when properly installed. An inner section 49 of the perimeter edge 45 overlaps the top 47 of the comb element 30 and the front 48 of the bridge portion 25 to hold the cover 40 in place.

A further fastening means is provided on the front of the cover 40 fitting inside the comb element 30, and then snapping into a correspondingly shaped opening 56 in the comb element 30 to firmly hold the cover 40 in place. In practice, the cover 40 is slid toward the open front end of the bridge portion 25 so that the inner section 49 slides under the front edge 48 of the bridge portion 25 until the edge of the outer section 46 of the perimeter 45 contacts the front edge portion 48. The cover 40 is then pushed down so that the detent 55 is displaced and the inner section 49 of the perimeter edge 45 slides inside the comb element 30 until the front edge of the outer section 46 abuts the top 47 of the comb element 30. The cover 40 is held in place by the elastic detent 55. The cover 40 may be removed by applying pressure to the outer exposed surface of the detent 55 to force it back through the opening 56. The cover 40 may then be lifted up and out.

In the use of this invention as herein described, the gardening tool 20 may be used by grasping the handle and stroking the comb element 30 on the ground dragging it through loose elements of earth, twigs, leaves and other matter. In the stroking action, the elastic response of the comb element 30, the bridge portion 25 and the cover 40 allows a large degree of resilient deformation to take place making it possible to maintain the comb element 30 in contact with the earth along its entire length even if the earth or working surface has troughs, hills or valleys. In addition, the resiliency combined with the shape and construction of the gardening tool 20 makes it possible, through manual dexterity on the part of the user, to apply only that amount of pressure necessary to accomplish the task at hand. The mesh cover 40 causes the earthen matter to be gathered without being lost over the top of the rake or around the sides as with conventional tools used for this purpose. When sufficient amounts of debris are collected the tool of this invention may then be used as a scoop to pick up and discard such refuse. This will be especially advantageous when being used in deep gulleys or depressions where it is necessary to reach down into the work area and lift out the unwanted matter.

In the embodiment shown, the comb element 30 is constructed of a strip-like configuration material having the lobes 38 on the lower edge. With further reference to my previous invention, the comb element could be a serpentine formation of a single rod-like element formed as tines similar or the same as that shown therein. With this construction, the comb element of my previous invention could be substituted for the comb element of this invention and vice versa.

In another embodiment of the invention, the comb element 30 and the bridge portion 25 comprising the rake element could be entirely molded or cast or stamped from one piece of material.

In the preferred embodiment shown, the handle 21 is threadedly engaged in an extended receptacle means 23 although other means such as compression clamps could be used that are readily perceptible to those skilled in the art. The receptacle means 24 should extend a sufficient length to be grasped by the hand or it may have a grooved portion 60 atop the receptacle to receive a bracket or clip type of securing device 61, such as that shown in FIGS. 1 and 4 of my previous patent application, Ser. No. 327,556, now U.S. Pat. No. 4,414,797, discussed above. Such a device 61 is shown in phantom in FIGS. 3 and 4 of this disclosure.

Figure 4:
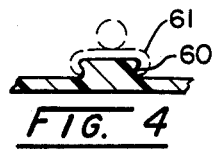
FIG. 4 is an elevational view taken along the line 4—4 of FIG. 3.

The cover 40 may have a receptacle means 27 on the closed end as shown in FIG. 4. With a handle the cover may be used separately as a scoop.

It is herein understood that although the present invention has been specifically disclosed with the preferred embodiments and examples, modification and variations of the concept herein disclosed, may be resorted to by those skilled in the art. Such modifications and variations are considered to be within the scope of the invention and the appended claims.

What is claimed is:

1. A garden tool, comprising:
   a. a handle; and
   b. a rake element including;
      i. a bridge portion centrally connected to one end of the handle, the bridge portion including a plurality of flex portions extending transversely and laterally on opposite sides of the handle, the bridge portions terminating and joined to ends depending or extending at an angle downward,
      ii. a comb element joined on the sides of the ends of the flex portions and,
      iii. the gage of the rake element being sufficiently thin that the tool is characterized by an elastic response when applied to a work surface.

2. A garden tool according to claim 1 wherein the rake element is molded or cast as one piece of material.

3. A garden tool according to claim 1 wherein the material is a non-metallic polyethylene or polystyrene type plastic.

4. A garden tool according to claim 1 wherein the flex portions and the comb element are separate pieces joined together by fastening means.

5. A garden tool according to claim 4 wherein the fastening means are pins and deformable holes.

6. A garden tool according to claim 1 wherein the comb element is open at the top and the bridge portion with flex portions is open at the front and a cover is provided as a closure over the open top and open front.

7. A garden tool according to claim 6 wherein the cover is constructed of open basket-like mesh.

8. A garden tool according to claim 7 wherein the cover is connected by insertion beneath an edge of the rake element on one side and an elastic detent on the opposite side.

9. A garden tool according to claim 1 wherein the rake element is provided with a threaded receptacle means and the handle is threadedly engaged therein.

10. A garden tool according to claim 1 wherein the rake element is provided with a receptacle means having grooves to receive a clip or bracket on the handle.

11. A garden tool according to claim 1 wherein the bridge portion and/or flex portions are provided with reinforcing ribs in the vicinity of their joinder to the ends.

12. A garden tool according to claim 1 wherein the cover is provided with a receptacle means having grooves to receive a clip or bracket on the handle, and/or a threaded receptacle means and the handle is threadedly engaged therein.

* * * * *